United States Patent
Hoeppner et al.

(10) Patent No.: US 9,959,096 B2
(45) Date of Patent: May 1, 2018

(54) METHOD FOR GENERATING TRUE RANDOM NUMBERS ON A MULTIPROCESSOR SYSTEM AND THE SAME

(71) Applicant: Technische Universitaet Dresden, Dresden (DE)

(72) Inventors: Sebastian Hoeppner, Dresden (DE); Felix Neumaerker, Dresden (DE); Andreas Dixius, Dresden (DE)

(73) Assignee: TECHNISCHE UNIVERSITAT DRESDEN, Dresden (DE)

( * ) Notice: Subject to any disclaimer, the term of this patent is extended or adjusted under 35 U.S.C. 154(b) by 51 days.

(21) Appl. No.: 15/272,550

(22) Filed: Sep. 22, 2016

(65) Prior Publication Data
US 2017/0083289 A1 Mar. 23, 2017

(30) Foreign Application Priority Data
Sep. 23, 2015 (DE) .......................... 10 2015 116 111

(51) Int. Cl.
*G06F 7/58* (2006.01)
(52) U.S. Cl.
CPC .......... *G06F 7/588* (2013.01); *G06F 2207/58* (2013.01)
(58) Field of Classification Search
None
See application file for complete search history.

(56) References Cited

U.S. PATENT DOCUMENTS

| | | | |
|---|---|---|---|
| 4,799,259 | A | 1/1989 | Ogrodski |
| 5,793,657 | A | 8/1998 | Nemoto |
| 6,487,571 | B1 | 11/2002 | Voldman |
| 6,807,553 | B2 | 10/2004 | Oerlemans |

(Continued)

OTHER PUBLICATIONS

Drutarovsky, et al. "Cryptographic System on a Chip based on Actel ARM7 Soft-Core with Embedded True Random Number Generator"Design and Diagnostics of Electronic Circuits and Systems, 2008. DDECS 2008. IIth IEEE Workshop on. Apr. 16-18, 2008. Bratislava, Slovakia.

(Continued)

*Primary Examiner* — David H Malzahn
(74) *Attorney, Agent, or Firm* — Helsin Rothenberg Farley & Mesiti P.C.

(57) ABSTRACT

A method for generating random numbers on multiprocessor systems and a multiprocessor system for generating true random numbers, using the method, generate truly random numbers with high entropy in a multiprocessor system with little additional effort to chip area and power dissipation. The method includes the steps of: measuring a phase error signal of a clock generator circuit of a first and a second processing unit respectively, forwarding the phase error signal of the respective clock generator circuit of the first and second processing unit to a true random network, combining the phase error signal of the clock generator circuit of the first processing unit and the phase error signal of the clock generator circuit of the second processing unit in the true random network to random bit streams, picking-up a random bit stream of the true random network, passing the respective random bit stream back to a random generator of the respective processing unit for outputting true random.

13 Claims, 3 Drawing Sheets

(56) References Cited

U.S. PATENT DOCUMENTS

Figure 1:
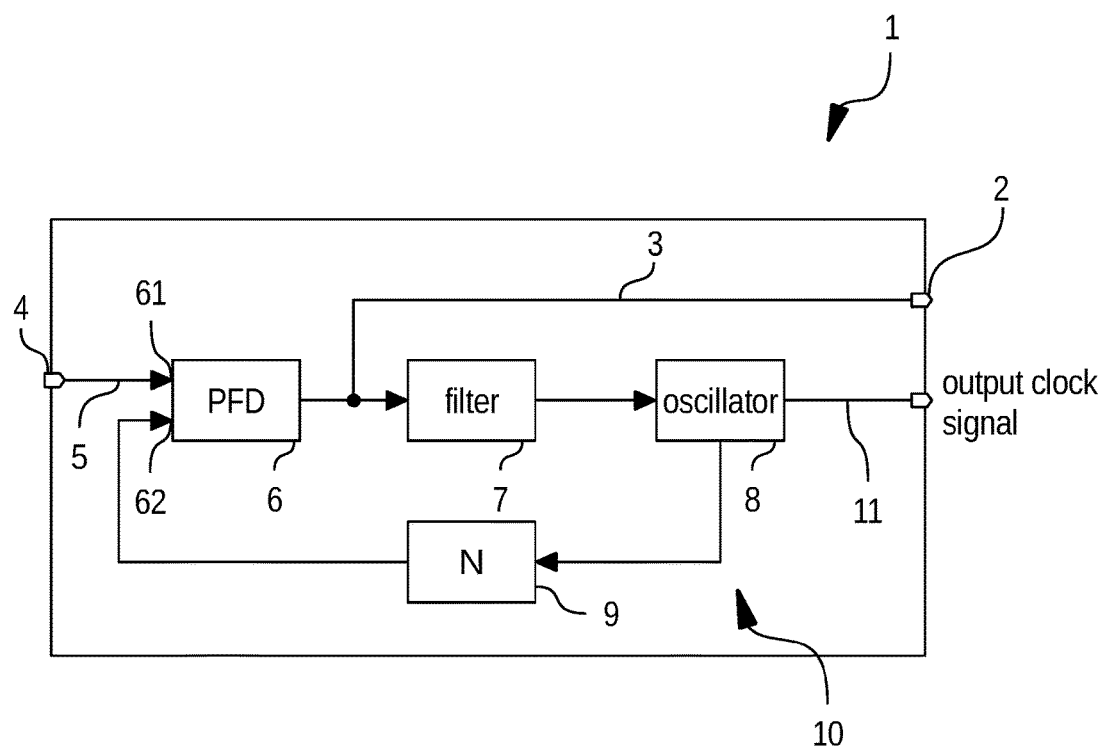

| | | | |
|---|---|---|---|
| 7,502,815 B1* | 3/2009 | Drimer | G06F 7/588 375/226 |
| 8,131,789 B2 | 3/2012 | Vergnes et al. | |
| 2007/0043798 A1* | 2/2007 | Boerstler | G06F 7/588 708/251 |
| 2009/0327380 A1 | 12/2009 | Cho | |
| 2010/0281088 A1* | 11/2010 | Wilber | G06F 7/588 708/251 |
| 2014/0244702 A1 | 8/2014 | Karpinskyy et al. | |
| 2017/0083289 A1* | 3/2017 | Hoeppner | G06F 7/588 |
| 2017/0090872 A1* | 3/2017 | Mathew | G06F 7/588 |

OTHER PUBLICATIONS

Liu, et al. "A digital-PLL-based tme random number generator-"Research in Microelectronics and Electronics, 2005 PhD, vol. I, No., Jul. 25-28, 2005, pp. 113-116.

Wold, et al. "Analysis and Enhancement of Random Number Generator in FPGA based on oscillator rings" International Journal of Reconfigurable Computing, vol. 2009 (2009), Article ID 501672, pp. 385-390.

European Search Report issued in European Patent Application No. 16190264.4, dated Feb. 3, 2017.

Drutarovsky et al., "A Simple PLL-Based True Random Number Generator for Embedded Digital Systems," Computing and Informatics, 23:501-515 (2004).

* cited by examiner

METHOD FOR GENERATING TRUE RANDOM NUMBERS ON A MULTIPROCESSOR SYSTEM AND THE SAME

The invention discloses a method for generating random numbers on multiprocessor systems.

The present invention also provides a multiprocessor system for generating true random numbers using the disclosed method.

FIELD OF THE INVENTION

The present invention generally relates to random number circuitry, and especially, to circuitry for generating true random numbers on multiprocessor systems.

BACKGROUND OF THE INVENTION

Generators for true random numbers based on electronic noise ("True Random Number Generators") are an important part of (multi-) processor systems, e.g. for applications in cryptography and scientific computing.

For the use in cryptography and scientific calculations a technical goal is the efficient generation of truly random numbers that are truly random and not pseudorandom. Because a private or secret parameter which is generated by a true random number generator is an interesting property to an attacker. Therefore, the generation of a random bit sequence is important and should be unpredictable to an attacker. One common method for generating a truly random sequence is to amplify the thermal noise in a diode. The disadvantage of this method is the use of external components. This approach enables an attacker to manipulate and read the random bit sequence from the device and consequently violate the security of the entire cryptographic system.

Therefore and in general, true random number generators are implemented as a separate circuit block, which e.g. is used as a central component in a system-on-chip. In U.S. Pat. No. 8,131,789 B2 a true random number generation circuitry is disclosed, whereas the circuitry utilizes a pair of oscillators driving a pair of linear feedback shift registers (LFSR) with their outputs being combined to generate random numbers. At least one of the oscillators is programmable with variable frequency, whereas at least two independent variable frequency ring oscillators whose outputs feed the independent linear feedback shift registers are necessary. So, U.S. Pat. No. 8,131,789 B2 uses dedicated, free running, ring oscillators only for random number generation. It uses the clock output signal. The drawback is additional power consumption and chip area (or FPGA resources). The disadvantage is the amount of chip area that is needed for realizing this circuitry for generating the true random numbers.

In K. Wold, et al: "Analysis and Enhancement of Random Number Generator in FPGA Based on Oscillator Rings", Int. Conference of Reconfigurable Computing and FPGAs, 385-390, doi:10.1109/ReConFig.2008.17, 2008 a true random number generator is constructed from many equal length oscillators whereas the clock outputs of several of these oscillators are linked via an XOR network in order to increase the entropy. It also proposes to add an extra flip-flop for sampling of the ring oscillator output clock. This will not be required in this invention, since the phase frequency detector (PFD) signal of the phase locked loops (PLL) is used as random source. The entropy is an important parameter in generating true random numbers, because it is a measurement for the amount of information included in the signal. This means, if the stream is for some reason predictable (e.g. significant correlations in the bits of the stream) and therefore not random, the information in this stream is low. Hence good randomness goes along with high entropy i.e. information.

Another approach for generating true random numbers is the usage of clock output signals of phase locked loops (PLL). In Drutarovsky, et al.: "Cyptographic System on a Chip based on Actel ARM7 Soft-Core with Embedded True Random Number Generator",Design and Diagnostics of Electronic Circuits and Systems, 2008. DDECS 2008. 11th IEEE Workshop on, vol., no., pp.1,6, 16-18 Apr. 2008 the basic principle behind the true random number generation is to extract the randomness from the jitter of the clock signals synthesized in the embedded analog PLLs, whereas the intrinsic part of jitter generated mainly in an analog Voltage Controlled Oscillator (VCOs) of PLLs. But for this solution, defined frequency ratios of the PLLs must be presented or active measures must be taken to synchronize the clock generators (PLLs). So the proposed true random generation uses the clock output signals of two different PLLs (here on FPGA) and combine them for random number generation by sampling with multiple flip-flops. This requires the resources (area and power) of two PLLs and demands for additional synchronization effort to generate good random data streams. The design is sensitive to mismatch in the sampling flip-flops. This will lead to a biased random numbers with reduced entropy. These issue must be overcome by additional extractor circuits (e.g. Von-Neumann extractor), resulting in additional area and power overhead.

In Chengxin Liu, et al.: "A digital-PLL-based true random number generator," Research in Microelectronics and Electronics, 2005 PhD, vol.1, no.,pp.113,116 vol.1, 25-28 Jul. 2005, a true random number generator based on a phase locked loop is presented which generates random numbers by means of two identical oscillators, one of which is regulated by phase comparing. With other words, it is proposed to use the clock output signals of two different ring oscillators and combines them by an additional sampling flip-flop. These ring-oscillators are dedicated only for random number generation and provide an area and power overhead. To generate random numbers with good properties (e.g. bias-free) the frequency of the ring oscillators is regulated by extra components (e.g. digital counters). Beside the provided area and power overhead another disadvantage of this approach is that not more than two ring-oscillators can be combined for random number generation.

An efficient generation of true random numbers requires a low resource consumption and high data throughput per area, whereas per area considers the chip area that is needed for processing the true random number generation. Furthermore, low energy consumption per bit with high entropy of the random signal should be required. The main disadvantages of previous solutions are that dedicated circuits (e.g. ring oscillators) are used for entropy generation. The disadvantages of these conventional TRNGs are the extra costs in term of power consumption and area. And some of the proposed circuits require extra calibration circuits to produce bias-free random numbers.

Another important property is the cost-feasibility (production costs).

BRIEF SUMMARY OF THE INVENTION

The stated goal and object of the present invention is to reduce the cost of the overall system, as well as the increasing energy efficiency, especially in multi-processor systems.

The object of the invention is therefore, to generate truly random numbers with high entropy in a multiprocessor system with little additional effort to chip area and power dissipation.

The object of the invention will be solved by a method for generating true random numbers on a multiprocessor system wherein the multiprocessor system comprises at least two processing units and wherein the method comprising the steps of:

- measuring a phase error signal of a clock generator circuit of a first and a second processing unit respectively,
- forwarding the phase error signal of the respective clock generator circuit of the first and second processing unit to a true random network,
- combining the phase error signal of the clock generator circuit of the first processing unit and the phase error signal of the clock generator circuit of the second processing unit in the true random network to random bit streams,
- picking-up a random bit stream of the true random network,
- passing the respective random bit stream back to the respective processing unit especially to a random generator for outputting true random numbers.

The multiprocessing system comprises several processing units. The processing units are working independently form each other. Therefore, a multiprocessing system comprises at least two processing units, preferably more than two.

Each processing unit comprises an own processor, a clock generation circuit for generating the clock signal and other system components of the processing unit, e.g. random access memory (RAM), bus systems and storage devices.

The clock generation circuit in its simplest form comprises an input that is connected to a reference clock signal, a phase frequency detector (or phase comparator), a filter, an oscillator, and a frequency divider, whereas all components forming a control loop. The phase comparator compares at its two inputs the phase angle of the input signal (meaning the reference clock signal) with the phase position of the oscillator (which is optionally divided by n—in the feedback loop by the frequency divider) and provides an output signal $E(s)$ referred to as the error signal. After filtering $E(s)$, $E(s)$ becomes an analog signal which corresponds to the phase error of the clock generator circuit. The oscillator is used for generating a periodic signal characterized by frequency, amplitude and phase. The output of the oscillator provides the clock signal for the system components. The filter forms the loop controller whereas the phase error signal is supplied to the filter which forms in accordance with a desired dynamic of the control loop a control variable that is supplied to the oscillator.

The most advantage of the aforementioned subject-matter is the usage of the phase error signal of all processing units of the multiprocessor system and generating true random numbers. Also the reusing of existing digital standard components saves space and the possibility of direct portability by design automation (synthesis & place and route tools) is given. No complicated clock generator circuit with identical oscillators, from which one is regulated, as disclosed in Chengxin Liu, et al., is necessary, because in Chengxin Liu, et al. a single true random number generator is used, which is provided as additional component within the system to generate random numbers. This disclosure proposes to use multiple, existing PLL clock generators for random number generation within the system. Rather the already existing components in the processing unit can be used for generating true random numbers by simply adding some wiring to the circuitry. No further chip area is necessary. For all processing units only one true random network is needed. Extra separate circuit blocks as a central component for the random number generating is not necessary. One central true random network can be used for all processing units in a multi-processor system. Therefore, the die area can be saved as well as power dissipation can be reduced. So, with other words, the main advantage of the proposed TRNG design is the hardware re-use of clock generators (PLLs), which generate the clock signal for other system components. A conventional TRNG uses a dedicated TRNG-circuit, which require a high design effort (self-calibration in order to overcome process, voltage and temperature (PVT) variation. Furthermore, the disadvantages of conventional TRNGs are the extra costs in term of operation power and area. The proposed design eliminates those drawbacks by using the output of the phase compare of the clock generator as a random bit. Nearly all (synchronous) integrated circuits (IC) do use clock generators, since it is the key component of a clocked circuit.

The clock generator itself needs to be carefully (auto-) calibrated in order to minimize deterministic jitter, which negatively affects the behavior of the circuit. Thereby when using PLL clock generators, the phase frequency detector (PFD) output bit has an equal probability of 1 and 0, which directly results in bias free random numbers.

As MPSoCs (Multi-Processor System-on-Chip) often have multiple clock generators for different clock domains, these multiple clock generators can be combined used for random number generation. Combination is performed by 1. summing the random bits from multiple MPSoC clock generators in an XOR network, 2. allowing multiple local MPSoC cores to read random bits from this network. The advantage is increased robustness, through a distributed (in terms of area) entropy-collection (reduction of coupling effects, crosstalk etc.) at minimum overhead in terms of chip area and power consumption.

In the true random network the phase error signals of the clock generator circuits of the first and at least the second processing unit are combined to random bit streams. The phase error signals (PFD output signals) are combined by a simple operation which preserves the entropy, such as XOR or XNOR. These simple operations are connected to a network structure (e.g. linear connection, tree or ring topology) which allows to pick up a random signal out of this network which contains the entropy of multiple random generator sources. This allows the processor core which PLL contributes a single random source to the network to pick up a random signal which contains the entropy of other (i.e. multiple) random number generators. These random bit streams generated in the true random network can be picked-up and a respective random bit stream can be passed back to the respective processing unit especially to a random generator for outputting true random numbers. The random signal which is picked up from the random network may lack in terms of required data-rate or statistical properties (e.g. entropy), which is an issue in all true random number generator designs. Therefore, a post processing unit (such as feeding the true random signal to a pseudo random number generator-PRNG) can be used locally within the core to increase the effective data rate of the random signal or enhance its properties.

In one embodiment of the invention the phase error signal has an entropy value respectively and the true random network combines the entropy values of every phase error signal of every processing unit in the multiprocessorsystem. So, the present disclosure proposes to combine the PFD outputs of PLLs by adding them within an XOR network where the network has multiple pick-up outputs for random bits. This allows the processor core which PLL contributes a single random source to the network to pick up a random signal which contains the entropy of other (i.e. multiple) random number generators. A common entropy source that can be used is jitter on the clock signal of the clock generator circuits generated by the oscillator. Jitter can be viewed as timing deviation from the theoretical correct position due to electronic or thermal noise. The random jitter will typically follow a Gaussian distribution characterized by a certain standard deviation ($\sigma$). Usually, jitter is an unwanted property in a system, but this behavior is useful when generating random signals in true random number generators.

The advantage of combining these entropy values is that the total entropy in the XOR network is larger than the entropy of a single PLL phase error signal source. Larger entropy allows for generation of higher quality random numbers at higher data rates e.g. by pseudo-random number generator post-processing. By allowing multiple cores to pick-up random numbers from the network, each core can source higher entropy than its own PLL locally generates. In addition, combining entropy sources which are widely spread over the system (e.g. chip area) results in higher robustness and less correlation between the random number sources.

The entropy values are combined by exclusive OR-circuits inside the true random network.

In one embodiment of the invention the phase error signal is generated by a phase frequency detector of the clock generator circuit of the processing unit. It is commonly known to use phase locked loops for generating true random numbers. But so far, a separated circuitry for the true random number generator comprising also a phase frequency detector or phase comparator was used. Now the already existing phase frequency detectors of the clock generator circuits of the processing units will be used, in order to reduce the necessary chip area and to reuse already existing components. These phase frequency detectors or especially the phase locked loops are synchronized by the reference clock.

Advantageously the phase error signal is directly forwarded to an output of the clock generator circuit or the phase error signal is filtered by a filter inside the clock generator circuit before the phase error signal is forwarded to an output of the clock generator circuit. By using the filtering option of said phase error signal, it is possible to decorrelate individual random values, e.g. by issuing only every n-th bit of a temporal stream of random values.

In one embodiment the clock generator circuit is controlled by a reference clock signal. This reference clock signal can be used for all clock generator circuits of the processing units in the multi-processor system, although, every clock generator circuit of every processing unit of the multiprocessing system operates independently from each other.

The advantages of the present invention lie in the generation of random numbers with high entropy without significant increase in chip area and power dissipation caused by the use of existing clock generator circuits. Furthermore, it is possible to generate true random numbers independently of the clock frequency adjustment of the clock generators of the single processing units and by combining the entropy values of noise sources of multiple, distributed clock generators in a true random network, it is possible to use this accumulated entropy on a processor unit of the multiprocessor system. The advantage of the usage of a decentralized production and usage of noise increases entropy and reduced correlations in the true random signal.

The object of the invention will also be solved by multiprocessor system for generating true random numbers comprising a true random network and at least two processing units whereas a processing unit comprises a processor, a clock generator circuit and a random generator wherein the clock generator circuit comprises a phase error signal output which is connected to the true random network and the true random network comprising outputs which are connected to the random generator of the processing units respectively. The advantage of this multiprocessor system is that already existing components of the system are reused and therefore the necessary chip area can be reduced, because only some few additional wiring is necessary. The proposed invention can be applied for both ASIC and FPGA implementations, where the PFD output signals of multiple PLL clock generators are can be combined. The key idea is, that the random numbers are generated on the same chip (ASIC or FPGA) where they are to be used (e.g. by processor cores) using components which are already required to clock these cores (PLLs). The usage of a dedicated FPGA only for random number generation is not efficient.

For the clock generator circuit a phase-locked loop or a delay-locked loop is used. No additional circuit blocks that generate the true random numbers are necessary. A phase locked loop comprises a phase frequency detector whereas the phase error signal is used for the generation of the true random numbers. The PFD output signal of a single PLL clock generator is used. Bias free random numbers are generated by the existing PLL control circuits.

In one embodiment the clock generator circuit has two outputs, one for outputting a clock signal and one for outputting a phase error signal and therefore using the already existing components of the system.

In a further advantageous embodiment the true random network comprises exclusive OR-circuits for combining phase error signal lines connected to an output of the clock generator circuits of the processing units respectively. XOR or XNOR is a symmetric operation which accumulated entropy and does not reduce the entropy. The 1-Bit inputs of the XOR gates can directly be connected to the PFD output signal of the PLLs. It is proposed to combine the PFD output signal of multiple PLL circuits by means of an XOR network.

The exclusive OR-circuits are formed as an open-loop or can be formed as an open-loop, the exclusive OR-circuits can also be formed as a closed-loop for self-oscillation purpose. When connecting the XOR circuits in a closed loop, oscillations in the random combination network might occur, which produces additional randomness. Thereby the XOR gates are not only utilized to add the randomness of the PLL PFD output signals, but to produce additional randomness by means of their jitter when oscillating in a closed loop configuration. Thereby the total entropy, available to the cores that pick-up from the XOR network is increased and no cost of additional chip area. So in a preferred embodiment the invention uses closed loop PLLs. Here the PFD output signal is used for example in contrast to U.S. Pat. No. 8,131,789 B2. The clock output signal of the PLL can be used for its main purpose i.e. clocking of circuit blocks. The advantage is reduced chip are and power consumption, since PLL is re-used. Alos, in contrast to U.S. Pat. No. 8,131,789 B2 the PFD output of PLLs includes the noise in terms of clock jitter of the PLL oscillator and the reference clock signal. It is already bias free, i.e. has equal probabilities of 1 and 0 and thereby excellent randomness properties.

BRIEF DESCRIPTION OF THE DRAWING FIGURES

Figure 2:
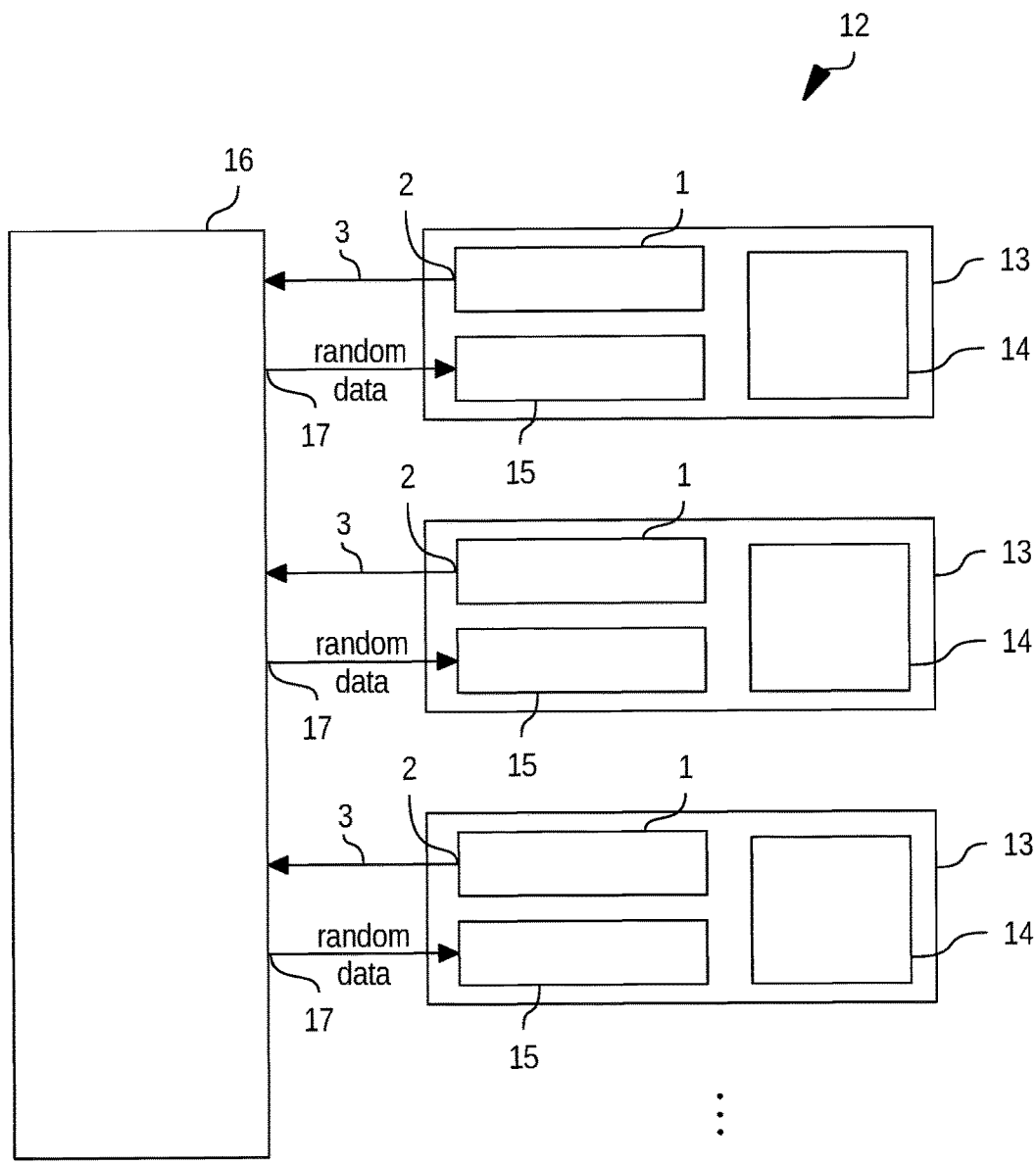
Figure 3:
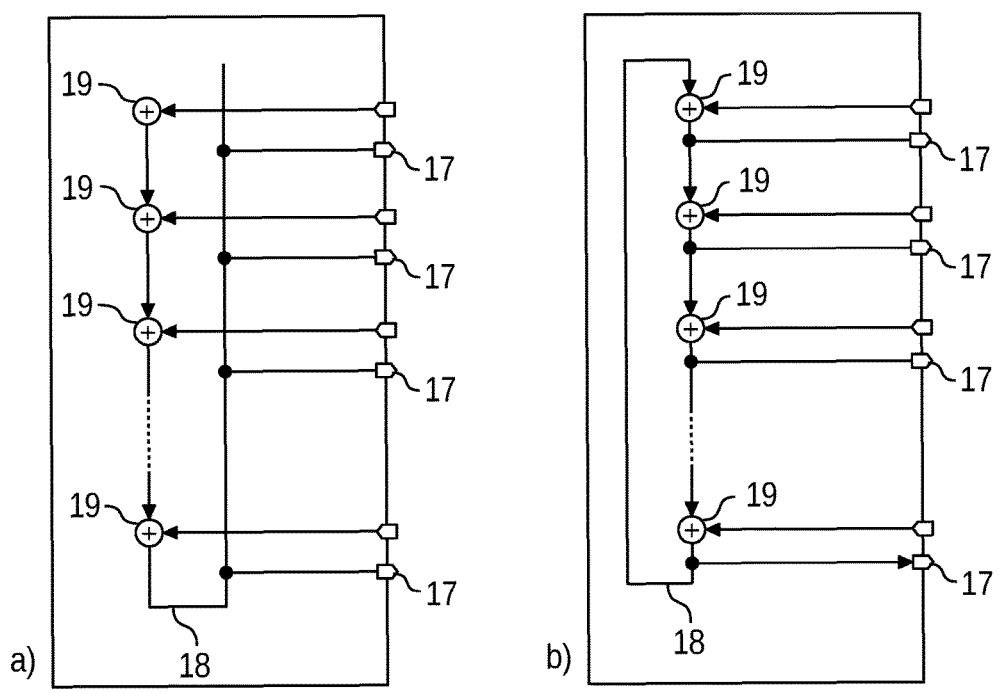

The invention will be illustrated by means of embodiments. The corresponding drawings show FIG. 1 Block diagram of a conventional phase-locked loop clock generator with an additional output for the phase error signal;

FIG. 2 Multi-processor system with disturbed random generator;

FIG. 3 Possible topologies of the network for combining the phase error signals: a) open loop, b) closed loop.

DETAILED DESCRIPTION

FIG. 1 shows a block of a conventional phase-locked loop clock generator 1 with an additional output 2 for the phase error signal 3. The clock generation circuit 1 in its simplest form comprises an input 4 that is connected to a reference clock signal 5, a phase frequency detector 6 (or phase comparator), a filter 7, an oscillator 8, and a frequency divider 9, whereas all components forming a control loop 10. The phase comparator 6 compares at its two inputs 61, 62 the phase angle of the input signal (meaning the reference clock signal 5) with the phase position of the oscillator (which is optionally divided by n—in the feedback loop by the frequency divider 9) and provides an output signal E(s) 3 referred to as the error signal 3. After filtering E(s), E(s) becomes an analog signal which corresponds to the phase error of the clock generator circuit 1. The oscillator 8 is used for generating a periodic signal characterized by frequency, amplitude and phase. The output of the oscillator provides the clock signal 11 for the system components. The filter 7 forms the loop controller whereas the phase error signal 3 is supplied to the filter 7 which form in accordance with a desired dynamic of the control loop 10 a control variable that is supplied to the oscillator 8.

FIG. 2 shows a multiprocessor system 12 with disturbed random generator. This means that the multiprocessor system 12 comprises several processor units 13 with their own processor 14, clock generation circuit 1 and a random generator 15. Every clock generator circuit comprises a phase error signal output 2 which is connected to the true random network 16 and the true random network 16 comprising outputs 17 which are connected to the random generator 15 of the processing units 13 respectively. In the true random network 16 the phase error signals 3 of the clock generator circuits 1 of the first and at least the second processing unit are combined to random bit streams 18. These random bit streams 18 generated in the true random network 16 can be picked-up and a respective random bit stream 18 can be passed back to the respective processing unit 13 especially to a random generator 15 for outputting true random numbers. The phase error signal 3 has an entropy value respectively and the true random network 16 combines the entropy values of every phase error signal of every processing unit 13 in the multiprocessor system 12. The jitter on the clock signal of the clock generator circuits 1 generated by the oscillator 8 is used as an entropy source. Usually, jitter is an unwanted property in a system, but this behavior is useful when generating random signals in true random number generators.

FIG. 3 shows possible topologies of the network 16 for combining the phase error signals. The phase error signals are combined via exclusive OR-circuits 19. The exclusive OR-circuits 19 can be formed as an open-loop (FIG. 3a)). The exclusive OR-circuits 19 can also be formed as a closed-loop for self-oscillation purpose. An XOR gate with logic 0 at its first input acts as buffer for the second input. When applying a logic 1 at the first input it acts as inverter for the second input. When connecting the XOR circuits in a closed loop, oscillations occur if there is an odd number of inverter configurations in the closed-loop. In this case the XOR network acts as free running oscillation. It accumulates noise from the switching transistors within the XOR gates in terms of jitter in the oscillation. Therefore, in a closed-loop XOR network with other random inputs (e.g. PLL PFD signals) oscillations occur temporarily, providing additional data transitions in the network and timings which are effected by the noise from the XOR gates themselves. When picking up bits from this network, e.g. by sampling, this results in larger available entropy.

The invention claimed is:

1. A method for generating true random numbers on a multiprocessor system wherein the multiprocessor system comprises at least two processing units and wherein the method comprises the steps of:
   measuring a phase error signal of a clock generator circuit of a first and a second processing unit respectively,
   forwarding the phase error signal of the respective clock generator circuit of the first and second processing unit to a true random network,
   combining the phase error signal of the clock generator circuit of the first processing unit and the phase error signal of the clock generator circuit of the second processing unit in the true random network to random bit streams,
   picking-up a random bit stream of the true random network, and
   passing the respective random bit stream back to a random generator of the respective processing unit for outputting true random numbers.

2. The method for generating true random numbers on a multiprocessor system according to claim 1, wherein the phase error signal has an entropy value respectively and the true random network combines the respective entropy value of every phase error signal of every processing unit in the multiprocessor system.

3. The method for generating true random numbers on a multiprocessor system according to claim 2, wherein the entropy values are combined by exclusive OR-circuits inside the true random network.

4. The method for generating true random numbers on a multiprocessor system according to claim 1, wherein the phase error signal is generated by a phase frequency detector of the clock generator circuit.

5. The method for generating true random numbers on a multiprocessor system according to claim 4, wherein the phase error signal is directly forwarded to an output of the clock generator circuit or the phase error signal is filtered by a filter inside the clock generator circuit before the phase error signal is forwarded to an output of the clock generator circuit.

6. The method for generating true random numbers on a multiprocessor system according to claim 1, wherein the clock generator circuit is controlled by a reference clock signal.

7. The method for generating true random numbers on a multiprocessor system according to claim 1, wherein the clock generator circuit of every processing unit of the multiprocessing system operates independently from each other.

8. A multiprocessor system for generating true random numbers comprising a true random network and at least two processing units wherein each processing unit comprises a processor, a clock generator circuit, and a random generator, and wherein the clock generator circuit comprises a phase error signal output which is connected to the true random network, and the true random network comprises outputs which are connected to the random generator of the processing units, respectively.

9. The multiprocessor system for generating true random numbers according to claim 8, wherein the clock generator circuit comprises a phase-locked loop or a delay-locked loop.

10. The multiprocessor system for generating true random numbers according to claim 8, wherein the clock generator circuit has two outputs, one for outputting a clock signal and one for outputting a phase error signal.

11. The multiprocessor system for generating true random numbers according to claim 8, wherein the true random network comprises exclusive OR-circuits for combining phase error signal lines connected to an output of the clock generator circuits of the processing units, respectively.

12. The multiprocessor system for generating true random numbers according to claim 11, wherein the exclusive OR-circuits are formed as an open-loop.

13. The multiprocessor system for generating true random numbers according to claim 11, wherein the exclusive OR-circuits are formed as a closed-loop for self-oscillation purpose.

\* \* \* \* \*